Figure 1:
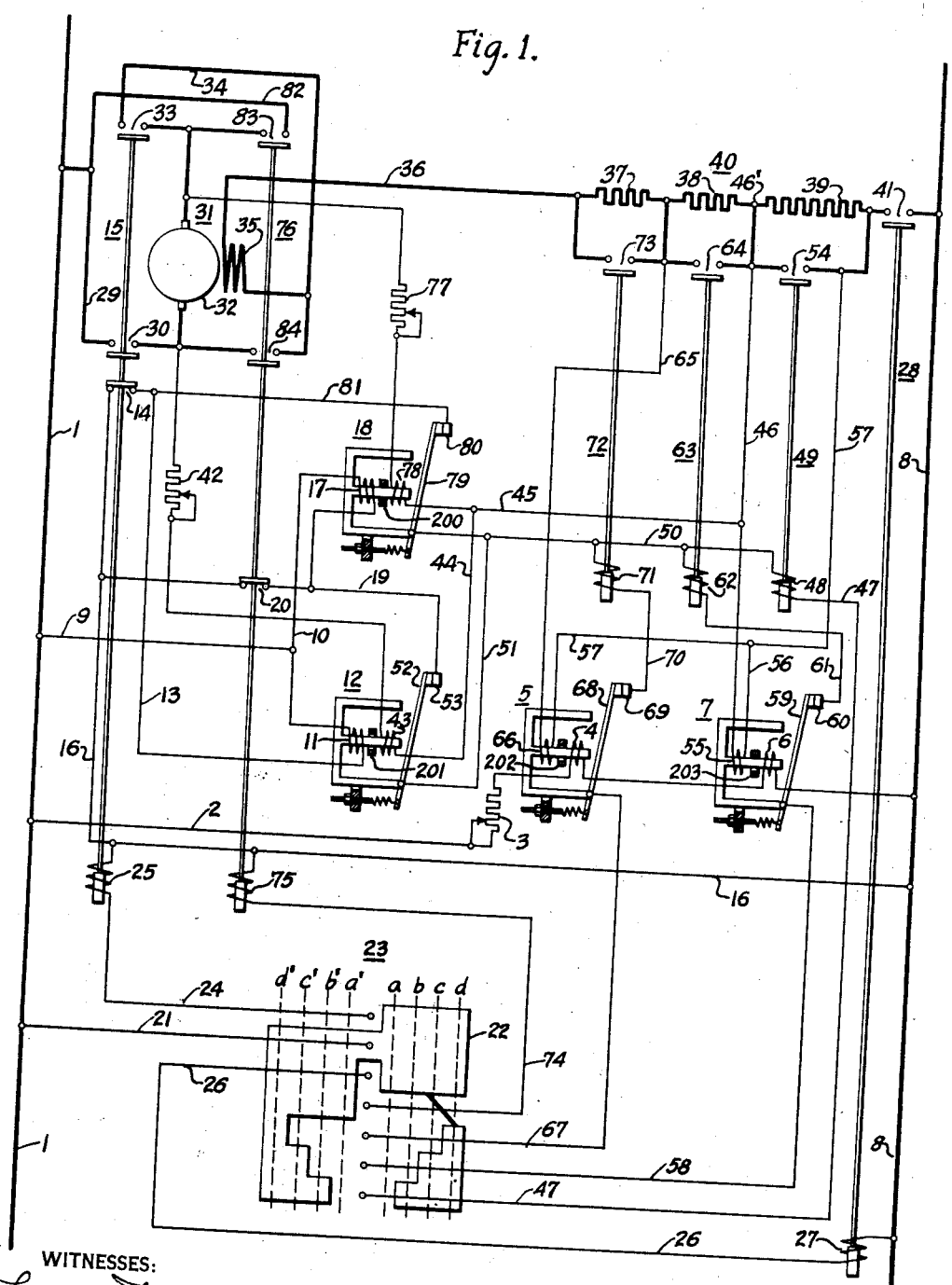

Oct. 12, 1937.  N. D. COOPER  2,095,793
REVERSING CONTROL SYSTEM
Filed Feb. 6, 1936   2 Sheets-Sheet 1

WITNESSES:
Leon J. Faja.
Olin C. Groome

INVENTOR
Nelson D. Cooper.
BY
Paul E. Friedemann
ATTORNEY

Oct. 12, 1937.  N. D. COOPER  2,095,793
REVERSING CONTROL SYSTEM
Filed Feb. 6, 1936  2 Sheets—Sheet 2

WITNESSES:
Leon J. Taza.
[signature]

INVENTOR
Nelson D. Cooper.
BY
Paul E. Friedemann
ATTORNEY

Patented Oct. 12, 1937

2,095,793

UNITED STATES PATENT OFFICE 2,095,793

REVERSING CONTROL SYSTEM

Nelson D. Cooper, Mariemont, Ohio, assignor to Westinghouse Electric & Manufacturing Company, East Pittsburgh, Pa., a corporation of Pennsylvania Application February 6, 1936, Serial No. 62,637

16 Claims. (Cl. 172—179)

This invention relates generally to motor control systems and more particularly to electrical systems of control for plugging or reversing the direction of rotation of a motor.

Heretofore, many schemes have been utilized for starting and reversing motors but it has been found generally that they do not satisfactorily meet all operating conditions. Some systems, though fairly satisfactory for regular starting service, give trouble when used for plugging service.

For may reversing control systems relays are used, which are responsive to the counter-electromotive force of the motor being controlled, for shunting the starting resistor sections. If, with such systems a load is imposed on the motor which prevents it from starting with the initial current that may be flowing through the resistors, then the system will fail to connect the motor across the line to develop maximum torque. Such a system for shunting the starting resistors is not suitable for steel mills and other similar installations where the motors used are very likely to be subjected to excessive loads.

Motor control systems in which well known lock-out type relays are utilized for shunting the starting resistors and for giving the desired time interval between successive shunting of such resistors have been found not to give satisfactory results, especially when the line voltage varies to any considerable extent.

In some cases, current limit relays have been utilized for controlling the acceleration of a motor and counter-electromotive force devices connected directly across the armature of the motor to be controlled have been utilized to control the plugging, but even such systems have been found to be undesirable when, for some reason, the motor is too heavily loaded and will not start.

One object of my invention, generally stated, is to provide a motor control system for reversing and starting which is simple and efficient in operation and which may be readily and economically installed.

Another object of my invention is to provide for reversing a motor without applying the full operating voltage to the motor in cumulative relation to the counter-electromotive force.

A more specific object of my invention is to utilize time limit devices for controlling the acceleration and time limit means responsive to an IR drop in the motor circuit and the counter-electromotive force of the motor for controlling the circuit arrangement during plugging to prevent an excessive voltage being placed across the motor terminals after the reversing connections have been established and before the motor has reached approximately zero speed or actually reversed.

Another object of my invention is to provide for connecting a motor directly across the line conductors with the starting resistance shunted within a certain time irrespective of whether or not the motor armature starts to rotate or not.

Figure 2:
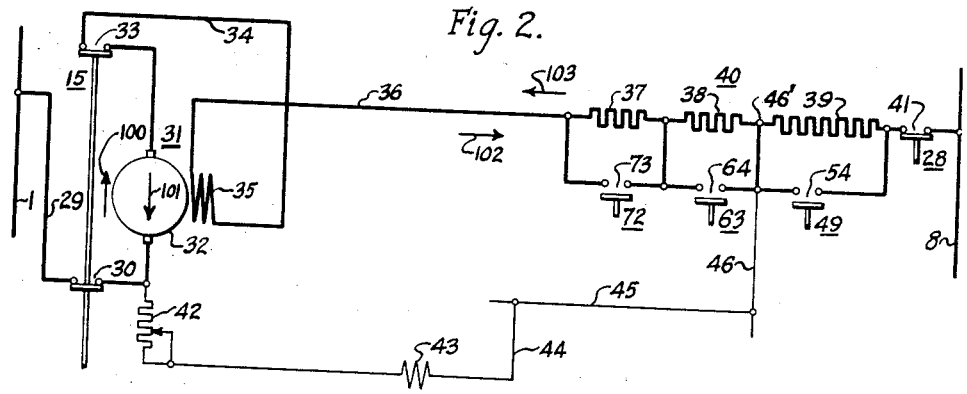
Figure 3:
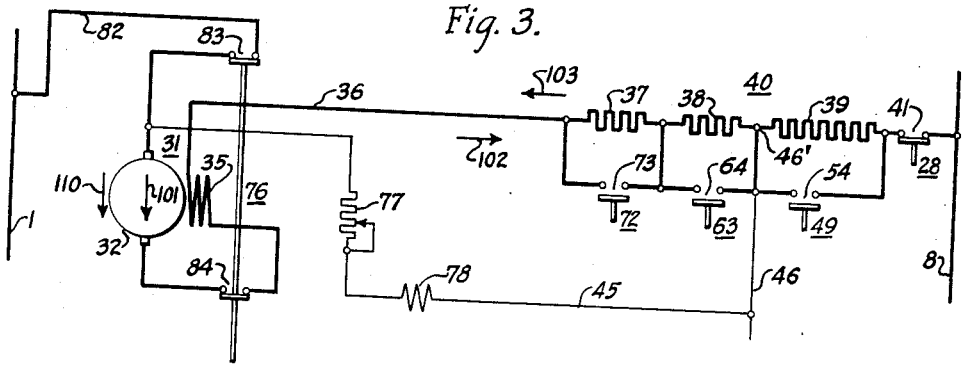
Figure 4:
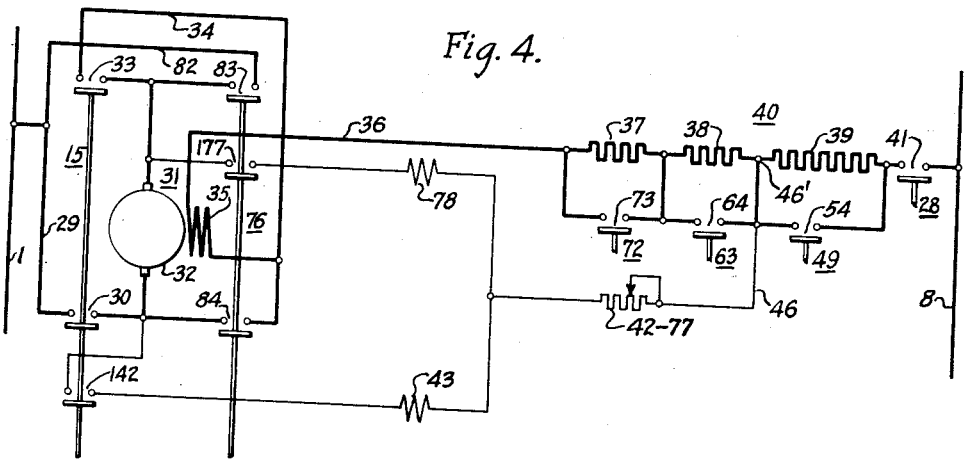

Other objects of my invention will become more apparent from a study of the following specification when such study is made in conjunction with the drawings accompanying the specification, in which Figure 1 is a diagram of the circuit connections of a preferred embodiment of my invention;

Fig. 2 shows diagrammatically a portion of the motor circuit in conjunction with my contribution to the art and shows the operating conditions for one direction of rotation, whereas Fig. 3 shows the motor circuit in combination with my contribution to the art for a different operating condition; and Fig. 4 is a diagrammatic showing of so much of the system of control shown in Fig. 1 as is necessary to illustrate a modified arrangement of my contribution to the art.

Referring more particularly to Fig. 1, conductors 1 and 8 represent the bus bars disposed to supply direct current to the motor 31. This motor 31 is disposed to be controlled in its direction of operation by a pair of directional contactors 15 and 76, and has a series field winding 35 and, during starting as well as plugging, is disposed to be in circuit with the resistor sections 37, 38 and 39 of the starting resistor 40.

A line contactor 28 is provided for connecting the motor to the bus bars 1 and 8 and is controlled in its operation by a master controller 23.

Resistor section 39 is a section having a much higher resistance value than the resistor sections 37 and 38 and may thus be designated the plugging resistor. The resistance value of section 39 may be about equal to the sum of the resistance values of sections 37 and 38. The control contactor 49 is disposed to shunt the plugging resistor 39 and is controlled in its operation by the master controller 23 and by the time limit devices 12 and 18, respectively, depending upon the direction of rotation of the motor just prior to a plugging operation which will be explained more in detail hereinafter. Time limit devices 5 and 7 control the accelerating contactors 63 and 72.

Time limit devices 5, 7, 12 and 18 are alike in design and constitute in themselves well known inductive time limit devices such as are disclosed and claimed in the patent of Walter Schaelchlin et al., No. 1,979,709, issued on November 6, 1934, and entitled "Time limit contactor".

In this type of time limit contactor or relay, the time contact may, of course, be changed by varying the sectional area of the copper sleeve, as the sleeves 200, 201, 202, and 203 I have shown. The sectional area may, of course, be any value from and including zero to some large value. Zero sectional area, namely the absence of a copper sleeve, produces the shortest time constant for a given design and adjustment. For the particular installation I have shown it may in fact be desirable not to use rings 200 and 201.

It is thought not necessary in this specification to go into the details of the structure of the time limit contactor, since it is believed the diagrammatic showing is ample and quite clear to illustrate my invention. However, briefly stated, the time limit contactors used, namely the devices 5, 7, 12 and 18, will, after deenergization of their magnetizing windings 55, 66, 11 and 17, release their armatures 59, 68, 52, and 79 to close the contacts or switches 60, 69, 53, and 80 controlled by such armatures. The time constant may be adjusted by the spring assembly shown in conjunction with each contactor; may also be adjusted by suitable adjustment of the voltage impressed on the neutralizing windings 6, 4, 43, and 78 of the time limit contactors; and may be adjusted by the variation of the resistance value of the sleeves 200, 201, 202, and 203. The function will become clearer as this discussion progresses.

In a starting and reversing control system, it is desirable to effect an immediate shunting of the plugging resistor during normal starting, but the shunting of the plugging resistor must be delayed during plugging operation for as long as the motor, after rotating in a given direction, is still generating a counter-electromotive force of any considerable value.

In many installations where reversing motors are used, it is desirable that positive forced acceleration be secured within a certain time interval regardless of how heavily the motor may be loaded during such starting. My invention provides for such operation but, in addition, very effectively delays the shunting of the plugging resistor during plugging operation for a time interval determined by the voltage variation on the neutralizing coil of the particular time limit contactor which may be controlling the plugging operation. The voltage impressed on the neutralizing coil is, however, determined by the IR drop across substantially half of the accelerating resistor 40 and the counter-electromotive force.

A better understanding of my contribution to the art can probably be had from a study of the starting cycles for both directions of operation and also for the operation of the system when the motor is reversed, namely plugged, to effect a rapid reversal.

Assuming that conductors or bus bars 1 and 8 are energized, then a circuit is established from conductor 1 through conductor 2, adjustable resistor 3, neutralizing coil 4 of the time limit contactor 5, neutralizing coil 6 of the time limit contactor 7, to the bus 8. Another circuit is established from the energized conductor 1 through conductors 9 and 10, magnetizing coil 11 of time limit contactor 12, conductor 13, back contact member 14 of the directional contactor 15, and conductor 16 to the bus 8. A further circuit is established from energized conductor 10 through magnetizing coil 17 of the time limit contactor 18, conductor 19, back contact members 20 of the directional contactor 76, to the energized conductor 16. Energization of the magnetizing coils 11 and 17, respectively, will cause the operation of time limit contactors 12 and 18 to move the armatures 52 and 79, respectively, in a counter-clockwise direction to open the switches 53 and 80, respectively. Opening of these switches effects no useful control at this moment, since the circuits these contacts are to control are held open by the master controller 23.

If the attendant wishes to start the motor in a forward direction, the segment 22 is shifted toward the left to make contact with the contact fingers to establish the necessary circuits to effect forward operation. Assuming that no forced acceleration is desired and that the acceleration of the motor is deliberately controlled by the attendant, he will, therefore, shift segment 22 from the off position at suitable intervals successively to the four forward positions $a$, $b$, $c$ and $d$, respectively.

In position $a$, a circuit will be established from conductor 1 through conductor 21, segment 22 of the master controller 23, conductor 24 and actuating coil 25 of the directional contactor 15 to the energized conductor 16. Another circuit established at the same time will be from the energized segment 22 through conductor 26 and the actuating coil 27 of the main line contactor 28, to the energized bus 8.

Operation of the directional contactor 15 will take place substantially simultaneously with the operation of the line contactor 28 whereupon a circuit is established for the motor 21 which may be traced from conductor 1 through conductor 29, contact members 30 of the directional contactor 15, the armature 32 of the motor 31, contact members 33 of the directional contactor 15, conductor 34, series field winding 35, conductor 36, resistor sections 37, 38 and 39 of the accelerating resistor 40 and contact members 41 of the main line contactor 28 to the energized bus 8.

Establishment of the motor circuit also immediately establishes an energizing circuit from the lower terminal of the motor armature 32 through the adjustable resistor 42, neutralizing coil 43 of the forward time limit plugging contactor 12, conductors 44, 45 and 46 to the junction 46', which is substantially at the midpoint, so far as resistance values are concerned, of the accelerating resistor 40. Since the motor at normal starting does not develop a counter-electromotive force, the neutralizing coil 43 is energized substantially proportional to the IR drop across resistor sections 37 and 38, and, in consequence, its effect, which is opposite to the effect of the magnetizing coil 11, will dissipate the residual magnetism and cause a release of the armature 52 to close the switch 53.

Normally, the effect of the neutralizing coil 43 even when fully energized is not sufficient to overcome the effect of the magnetizing coil 11 but it will be noted that the operation of the directional contactor 15 effected the opening of the back contact members 14, thereby opening the energizing circuit for the magnetizing coil 11. It is thus clear that the energization of the neutralizing coil 43 which is during the starting here discussed of considerable magnitude, will cause a release, as stated, of armature 52 thereby closing switch 53 a definite time interval after the opening of contact members 14.

Since it was assumed the operator is moving the master controller slowly with a considerable time interval between successive positions, no energizing circuit will normally be effected by the closure of switch 53. However, movement of the master controller 23 to the position b establishes a circuit from the energized segment 22 through conductor 47, actuating coil 48 of the plugging control contactor 49, conductors 50 and 51, armature 52, switch 53, conductor 19 and back contact members 20 (which will, of course, be closed at this stage of operation), to energized conductor 16. The plugging resistor will thus be immediately shunted upon movement of the master controller to position b, and the rise in voltage across the motor terminals will not be delayed longer than the time constant of relay 12.

Operation of the plugging control contactor 49 closes the contact members 54 to shunt the plugging resistor 39 and in so doing not only establishes a shunt around the plugging resistor 39 but also establishes a shunt across the energizing circuit of the magnetizing coil 55 of the time limit contactor 7.

At the time the motor circuit is established, the magnetizing coil 55 is, of course, energized proportional to the IR drop across the resistor 39 and thus causes a counter-clockwise movement of the armature 59 to open the switch 60. Similarly, the magnetizing coil 66 is energized upon the establishment of the motor circuit by the circuit through conductor 65, magnetizing coil 66, to the conductor 57. Time limit contactor 5 thus causes the movement of the armature 68 in a counter-clockwise direction to open switch 69. Therefore, at the time that the plugging control contactor 49 is set into operation, switches 60 and 69, respectively, are open. However, when this plugging control contactor operates the circuit through conductor 46, magnetizing coil 55 and conductors 56 and 57 is shunted whereupon the magnetizing coil 55 is deenergized and in consequence switch 60 will close after a predetermined interval of time determined by the adjustment of the spring assembly shown with time limit contactor 7 and the adjustment of resistor 3.

After switch 60 is closed, accelerating contactor 63 may be energized if the segment 22 of the master controller 3 is moved to position c. When segment 22 is moved to position c, a circuit is established from the energized segment 22 through conductor 58, armature 59, switch 60, conductor 61 and actuating coil 62 of the accelerating contactor 63, to the energized conductor 50. Operation of the accelerating contactor 63 establishes a shunt circuit for both the accelerating resistor 38 and the magnetizing coil 66 of time limit contactor 5.

After a predetermined interval of time, switch 69 closes and if the segment 22 is then moved to position d, a circuit is established from the energized segment 22 through conductor 67, armature 68, switch 69, conductor 70 and actuating coil 71 of the accelerating contactor 72, to the energized conductor 50. Operation of the accelerating contactor 72 closes the switch or contact members 73 to shunt the last accelerating resistor 37, whereupon the motor will be subjected to full line voltage and thus operate at normal speed for the particular load it may be carrying.

If the attendant wishes to operate the motor in the reverse direction, he, of course, moves the segment 22 from the neutral or off position through positions a', b', c' to the position d'. A circuit will be established from the segment 22 through conductor 74, actuating coil 75 of the directional contactor 76 and conductor 16 to the bus 8. At the same time the line contactor 28 would be energized and a motor circuit for reverse operation will be established from the conductor 1 through conductor 82, contact members 83, armature 32 of motor 31, and contact members 84 to the energized conductor 34. Since the potential across the armature is reversed, the neutralizing coil 78 will be energized in opposition to the energization of the magnetizing coil 17 by a circuit that may be traced from the bus 1 through conductor 82, contact members 83, the upper terminal of the motor through adjustable resistor 77, coil 78, conductors 45 and 46 to the junction 46'. However, since the operation of the directional contactor 76 causes the opening of the back contact members 20, magnetizing coil 17 is deenergized and since the neutralizing coil 78 is energized to a considerable extent, being energized in proportion to the IR drop across the resistor sections 37 and 38, the armature 79 will move in a clockwise direction to close switch 80 and if the controller segment 22 has in the meantime been moved to position b', a circuit is established for the actuating coil 48. This circuit may be traced from segment 22 through conductor 47, actuating coil 48 of the plugging control contactor 49, conductor 50, armature 79, switch 80, conductor 81, and back contact members 14 which will now be closed to the energized conductor 16. It is thus obvious that the plugging resistor 37 will again be shunted and acceleration for the reverse direction thereafter follows exactly the cycle hereinbefore disclosed in connection with the forward direction of operation of motor 31.

If forced acceleration is desired, which is the usual operation when utilizing a system of control such as I have devised, then the attendant will move the segment 22 from the off position to the full speed position, namely position d for forward operation or d' for reverse operation. If the master controller is thrown over to the extreme or full speed position, it is, of course, clear that the particular directional contactors selected will immediatey operate and the line contactor will operate.

Assuming that forward operation is selected, which means that directional contactor 15 is operated to establish the motor circuit and also to open the circuit for the magnetizing coil 11. The neutralizing coil 43 will be energized to a considerable extent as heretofore explained, namely proportional to the IR drop across resistors 37 and 38 with the result that in a comparatively short interval of time, switch 53 will close and since the segment 22 is in the d position, plugging control contactor 49 is energized as heretofore explained without much delay. The accelerating contactors 63 and 72 are operated and the switches 64 and 73 operated thereby close after predetermined intervals of time depending upon the successive operation of time limit contactors 7 and 5. It will be noted that this method of starting takes no account of the rise in armature current or the variations in the counter-electromotive force during starting and thus is not affected by the loading of the motor during such starting.

For reverse operation with forced acceleration, segment 22 will, of course, be moved to position d' with the result that switch 80 will close very shortly after the operation of the directional contactors 76 and the main line contactor 28 and in consequence the plugging resistor 39 will be shunted and thereafter the remaining accelerating resistor sections will be shunted at predetermined intervals of time and forced acceleration is thus accomplished.

Assuming that the motor is operating in the forward direction at full speed and the attendant wishes to plug and thus rapidly reverse the motor, which, of course, means that segment 22 will be shifted from position d to d'. During such movement, the main line contactor will, of course, be deenergized as the segment moves through the off position and directional contactor 15 will also be deenergized. However, immediately thereafter the main line contactor 28 will be reenergized and the directional contactor 76 will be energized to establish a motor circuit for reverse operation.

To fully understand and appreciate a further and important contribution, I have made to the prior art, attention is directed to Fig. 2 where the arrow 100 designates the direction of the applied voltage for forward operation, the arrow 101 designates the direction of the counter-electromotive force, the arrow 102 designates the direction of current, and the arrow 103 designates the direction of the IR drop across resistor sections 37 and 38.

If the motor is plugged as stated, then conditions in the motor circuit are considerably different and this is illustrated by Fig. 3 where arrow 110 now designates the applied voltage. However, the counter-electromotive force is at the moment of reverse connection still the same and designated by arrow 101. The current through resistor sections 37 and 38, in view of the circuit arrangement, is also still the same and designated by arrow 102 and the IR drop is still in the same direction and may be designated by arrow 103. The IR drop and the counter-electromotive force are, of course, in opposition, but since the neutralizing coil 78 of the time limit contactor 18 is connected at the upper terminal of the motor armature 32 and connected at the junction 46' of the accelerating resistor 40, the energization of the neutralizing coil is determined by the difference between the IR drop across resistor sections 37 and 38 and the counter-electromotive force. This means that, despite the fact that the directional contactor 76 operated by the movement of the master controller to the full speed reverse position opens the contact members 20 to deenergize the magnetizing coil 17, switch 80 nevertheless remains open since the residual magnetism of the time limit contactor 18 holds armature 79 in the vertical position. The IR drop and the counter-electromotive force being in opposition, the voltage on the neutralizing coil 78 is substantially zero and will not be of any considerable magnitude until the motor has been brought substantially to rest. The moment the motor is at rest and the counter-electromotive force indicated by the arrow 101 has vanished, the neutralizing coil 78 is, of course, energized proportional to the voltage drop across resistor sections 37 and 38 and in a short interval of time causes the closing of switch 80 whereupon a circuit may be established for the actuating coil 48 of the plugging control contactor 49.

In other words, during the retardation of the motor 31, when both the line voltage and the counter-electromotive force are actuated in the same direction, the plugging resistor 39 is not shunted and cannot be shunted since the time limit contactor 18 will hold the switch 80 open until the neutralizing coil 78 can be sufficiently energized to dissipate the residual magnetism and thus effect the closing of the switch 80.

When the motor is plugged from a reverse operation, the counter-electromotive force is, of course, in a reverse direction but in such case the time limit contactor 18 does not control the plugging control contactor 49 but time limit device 12 controls the plugging control contactor 49. In such instant the neutralizing coil 43 is energized proportional to the difference between the IR drop across resistors 37 and 38 and the counter-electromotive force and such difference remains quite small up to the moment the motor is substantially at rest, whereupon the time limit device 12 releases its armature 52 to close switch 53 to thus establish the necessary circuit for energizing the plugging control contactor 49.

In some instances, it may be desirable to connect the neutralizing coils 43 and 78 through one adjustable resistor such as designated by 42—77 in Fig. 4. In such instance, the directional contactors 15 and 76 must be provided with an extra pair of make contact members as 142 and 177, respectively. The showing in Fig. 4 otherwise functions exactly as heretofore explained for the diagram shown in Fig. 1. No detailed analyses of the various schemes of operation are thought to be necessary. If the motor is operated in the forward direction, contact members 142, of course, close to energize the neutralizing coil 43 and forced acceleration is accomplished exactly as heretofore explained. If the motor is plugged, contact members 142 will, of course, open. Neutralizing coil 78 thus controls the plugging operation.

I claim as my invention:

1. In a motor control system, in combination, a motor having an armature, a circuit including a resistor, disposed to be connected in circuit relation with the motor, reversing switches for the motor, a contactor for shunting the resistor, a time-limit relay provided with an armature for controlling the operation of the contactor, a main, or magnetizing coil on the relay for actuating the armature to a given position, means for deenergizing the magnetizing coil, a second, or neutralizing, coil for the relay disposed to dissipate the residual magnetism of the relay upon a deenergization of the magnetizing coil to thus release the armature after a given time interval whereby a circuit is established to effect the operation of said contactor for shunting the resistor, said second coil being so connected in circuit relation with said first-named circuit to be substantially unenergized during reversal of the motor, whereby an immediate operation of the contactor is prevented when the reversing switches are actuated to effect a reversal of the motor.

2. In a motor control system, in combination, a source of power, a motor, means for connecting the motor to the source of power, a resistor for controlling the flow of current in the motor when connected to the voltage terminals of said source of power, means for reversing the connection of the armature terminals of said motor to said source of power and means for shunting a portion of the resistor, controlled by the operation of the reversing means and by electric control means having a pair of actuating circuits one of said circuits being connected to the source of power and thus responsive to the voltage of said source and the other of said circuits being connected to one of the motor armature terminals and to a junction intermediate the ends of said resistor to thus be responsive to the counter-electromotive force of the motor and the IR drop of a portion of said resistor.

3. In a control system, in combination, a source of direct current power, a direct current motor having a conventional armature and armature terminals therefor, means for connecting the motor to the source of power, a resistor for controlling the flow of current in the motor, means for reversing the connection of the motor armature terminals with reference to said source of power, and resistor shunting means for shunting successive sections of said resistor, controlled by the operation of the reversing means and by electric control means, said electric control means having a pair of actuating circuits connected to be energized respectively by the voltage of the said source of power and the voltage drop across the armature terminals and a portion of said resistor and designed to operate regardless of whether a counter-electromotive force be developed by the motor or not.

4. In a motor controlled system, in combination, a source of direct current power, a direct current motor having a conventional armature and armature terminals therefor, means for connecting the said armature terminals to the said source of power, a resistor for controlling the flow of current in the motor, means for reversing the armature terminals of said motor with reference to said source of power, resistor shunting means for shunting a portion of said resistor controlled by the operation of the reversing means and electric control means for also controlling the operation of the resistor shunting means, said control means having a pair of actuating circuits producing opposing effects on said electric control means and connected to be energized respectively by the voltage of said source of power, and the counter-electromotive force of said motor and by a potential proportional to a portion of the resistance drop across said resistor, whereby said resistor shunting means is prevented from operating as long as counter-electromotive force is developed by said motor during reversing of the connections of the armature terminals of the motor with reference to said source of power.

5. In a motor controlled system, in combination, a source of power, a motor, means for connecting the motor to the source of power, means for reversing the connection of the motor to said source of power, a resistor for controlling the flow of current through said motor, a switch for shunting a portion of said resistor, a plurality of circuits for actuating said resistor shunting switch and a pair of relays disposed to interconnect said switch actuating circuits with said source of power, said relays each having a pair of actuating circuits responsive respectively to the voltage of said source of power, and the counter-electromotive force of the motor and the IR drop across a portion of said resistor and means for interrupting the actuating circuits of the resistor shunting switch.

6. In a motor controlled system, in combination, a source of power, a motor, means for connecting the motor to the source of power, means for reversing the armature connection of said motor with reference to said source of power, a resistor for controlling the flow of current through said motor, a switch for shunting a portion of said resistor, a plurality of circuits for actuating said resistor shunting switch and a pair of relays disposed to interconnect said switch actuating circuits with said source of power, said relays each having a plurality of circuits responsive respectively to an electrical characteristic of the source of power, an electrical characteristic of the motor being controlled, an electrical characteristic of said resistor and an electrical characteristic of the relay itself, and means for interrupting the actuating circuits of the resistor shunting switch.

7. In a motor controlled system, in combination, a source of power, a motor, means for connecting the motor to the source of power, means for reversing the armature connections of said motor with reference to said source of power, a resistor for controlling the flow of current through said motor, a switch for shunting a portion of said resistor, a plurality of circuits for actuating said resistor shunting switch and a relay disposed to interconnect said switch actuating circuits with said source of power, said relay having a pair of actuating circuits responsive respectively to the voltage of said source of power, and to the counter-electromotive force of the motor and the IR drop of a portion of said resistor and means mechanically interlocked with the means for reversing the motor for interrupting the actuating circuits of the resistor shunting switch each time the means for reversing the motor is moved to the off position.

8. In a motor control system, in combination, a source of power, a motor, means for connecting the motor to the source of power, means for reversing the armature connections of said motor with reference to said source of power, a resistor for controlling the flow of current in the motor, a switch for shunting a portion of said resistor, a plurality of circuits for actuating said resistor shunting switch and a relay disposed to control the connection of one of said switch actuating circuits, said relay having a plurality of actuating circuits responsive respectively to a magnetic characteristic of the relay, the voltage of the source of supply, the counter-electromotive force and the IR drop of a portion of said resistor and means mechanically interlocked with the means for reversing the motor for interrupting the controlled actuating circuit of the resistor shunting switch each time the means for reversing the motor is moved through the off position.

9. In a motor control system, in combination, a source of direct current power, a motor, means for connecting said motor to said source of power, means for reversing the armature connection of said motor with reference to said source of power, a plurality of resistor sections adapted to control the flow of fluid through said motor, a plurality of resistor shunting switches and a control relay having a plurality of circuits responsive respectively to the voltage of said source of power and the IR drop across certain of said resistor sections and the counter-electromotive force of said motor for controlling the operation of one of said resistor shunting switches.

10. In a motor control system, in combination, a source of direct current power, a motor, means for connecting said motor to said source of power, means for reversing the armature connection of said motor with reference to said source of power, a plurality of resistor sections adapted to control the flow of fluid through said motor, a plurality of resistor shunting switches and a control relay having a plurality of circuits responsive respectively to the voltage of said source of power and the IR drop across certain of said resistor sections and the counter-electromotive force of said motor for controlling the operation of one of said resistor shunting switches, and time limit means for controlling the successive operation of the remaining resistor shunting switches.

11. In a system of control for electric motors, in combination, a source of direct-current power, a reversible motor, switching means adapted to connect said motor to said source of power for one direction of rotation, a second switching means adapted to connect said motor to said source of power for another direction of rotation, a starting resistor, a plugging resistor, contactor means for shunting the plugging resistor, a time limit relay connected to be responsive during plugging of the motor to the difference between the counter-electromotive force of the motor and the IR drop across at least one of the sections of the starting resistor whereby the relay is positively prevented from operating until a definite time interval after the said difference between the said counter-electromotive force and the said IR drop has attained a given value, and means responsive to the operation of said relay adapted to cause the operation of said contactor means for shunting the plugging resistor.

12. In a system of control for a direct-current reversing motor, in combination, a source of direct current, switching means for connecting the motor to said source of direct current for one direction of rotation, switching means for connecting the motor to said source of direct current for the other direction of rotation, means for preventing the operation of both of said switching means at the same time, a starting resistor, a plugging resistor, an electromagnetic contactor adapted to shunt said plugging resistor, and a time limit relay having a magnetizing coil adapted to be deenergized when the motor is plugged, namely when one of the switching means is operated to disconnect the motor from the source of power and the other switching means is operated to connect the motor for reverse operation, and a neutralizing coil connected to be responsive to the difference between the counter-electromotive force of the motor and the IR drop across the starting resistor adapted to dissipate the residual magnetism of the relay to thus cause it to operate to control the contactor for shunting the plugging resistor.

13. In a motor control system for controlling the reversal of a direct-current motor, in combination, a source of power, a motor, a resistor for limiting the voltage impressed on the motor, a time-limit relay adapted to operate a substantially definite time interval after the difference between the IR drop across the said resistor and the counter-electromotive force of the motor during plugging has attained a predetermined value, and means, responsive to the operation of said relay, adapted to increase the voltage impressed on the motor.

14. In a system of control for a direct-current motor, in combination, a source of power, a motor, a starting circuit therefor, a time-limit relay having a magnetizing coil adapted to be deenergized when the motor connections to the source of power are reversed, a neutralizing coil adapted to dissipate the magnetism produced by said magnetizing coil, said neutralizing coil being so connected to the motor and its starting circuit that it, the neutralizing coil, becomes energized only of a magnitude sufficient to dissipate the magnetism of the magnetizing coil when the difference between the counter-electromotive force and a voltage characteristic of the starting circuit is of a given magnitude, and means responsive to the relay for varying the voltage impressed on said motor.

15. In a system of control, a time-limit relay having a magnetizing coil and a neutralizing coil, means adapted to deenergize said magnetizing coil, means for establishing a circuit for said neutralizing coil by the operation of said means for deenergizing said magnetizing coil, said circuit including two potential effects acting in opposition to each other and at least one of said effects varying from a given relatively high value to no value whereby said magnetism produced by said magnetizing coil is not dissipated before said potential effect has decreased to substantially no value.

16. In a system of control for controlling the plugging operation of a direct-current motor, in combination, a plugging resistor, means for shunting said resistor, and electromagnetic relay means including a main coil normally energized but arranged to be deenergized during plugging of the motor, and a neutralizing coil energized during plugging of the motor by a voltage proportional to the difference between the IR drop across a section of the motor circuit and the counter-electromotive force of the motor during plugging, and means responsive to the operation of said relay adapted to control the shunting of said plugging resistor.

NELSON D. COOPER.